(12) United States Patent
Takahata et al.

(10) Patent No.: US 12,132,289 B2
(45) Date of Patent: Oct. 29, 2024

(54) COPPER ELECTRODE MATERIAL

(71) Applicant: JX Advanced Metals Corporation, Tokyo (JP)

(72) Inventors: Masahiro Takahata, Ibaraki (JP); Hideaki Fukuyo, Tokyo (JP); Toru Imori, Tokyo (JP); Koichi Takemoto, Ibaraki (JP)

(73) Assignee: JX Advanced Metals Corporation, Toyko (JP)

( * ) Notice: Subject to any disclaimer, the term of this patent is extended or adjusted under 35 U.S.C. 154(b) by 605 days.

(21) Appl. No.: 17/288,403

(22) PCT Filed: Jan. 6, 2020

(86) PCT No.: PCT/JP2020/000092
§ 371 (c)(1),
(2) Date: Apr. 23, 2021

(87) PCT Pub. No.: WO2020/174880
PCT Pub. Date: Sep. 3, 2020

(65) Prior Publication Data
US 2021/0359482 A1    Nov. 18, 2021

(30) Foreign Application Priority Data

Feb. 28, 2019 (JP) ................................ 2019-036759
Jul. 1, 2019 (JP) ................................ 2019-123226

(51) Int. Cl.
*H01S 3/038* (2006.01)
*C22F 1/08* (2006.01)
*H01S 3/225* (2006.01)

(52) U.S. Cl.
CPC .............. *H01S 3/0388* (2013.01); *C22F 1/08* (2013.01); *H01S 3/2251* (2013.01); *H01S 3/2256* (2013.01)

(58) Field of Classification Search
CPC .... H01S 3/0388; H01S 3/2251; H01S 3/2256; H01S 3/038; C22F 1/08; H01B 1/026; H01B 1/02; C22C 9/00; C22C 9/01
(Continued)

(56) References Cited

U.S. PATENT DOCUMENTS 8,922,027 B2 * 12/2014 Sakai ...................... H01L 24/13
257/781
9,938,606 B2 *  4/2018 Maki ................... C23C 14/3414
(Continued)

FOREIGN PATENT DOCUMENTS

CN         107354482 A      11/2017
CN         107922998 A      4/2018
(Continued)

OTHER PUBLICATIONS

"Influence of Impurities in Cathodic Copper on the Ductility of Copper Wires", Journal of Materials Engineering and Performance, Jul. 2011, DOI: 10.1007/s11665-011-0036-8 (Year: 2011).*
(Continued)

*Primary Examiner* — Vu A Vu
(74) *Attorney, Agent, or Firm* — Faegre Drinker Biddle & Reath LLP

(57) ABSTRACT

A copper electrode material comprising Cu and unavoidable impurities, wherein the content of the unavoidable impurities is 1 ppm by mass or less and the average crystal grain diameter is 100 μm or less. A copper-containing electrode material having improved corrosion resistance is provided by the copper electrode material.

5 Claims, 7 Drawing Sheets

(58) Field of Classification Search
USPC .................................................. 372/38.05
See application file for complete search history.

(56) References Cited

U.S. PATENT DOCUMENTS

| | | | |
|---|---|---|---|
| 10,141,509 B2* | 11/2018 | Ando | H10N 70/826 |
| 2008/0223728 A1 | 9/2008 | Shindo et al. | |
| 2013/0329763 A1 | 12/2013 | Kardokus et al. | |
| 2015/0308009 A1* | 10/2015 | Nakaya | C22C 9/00 |
| | | | 148/680 |
| 2016/0332231 A1 | 11/2016 | Ishikawa et al. | |
| 2017/0066055 A1 | 3/2017 | Kitakizaki et al. | |
| 2017/0327961 A1 | 11/2017 | Suenaga et al. | |
| 2018/0240612 A1 | 8/2018 | Ishikawa et al. | |

FOREIGN PATENT DOCUMENTS

| | | |
|---|---|---|
| EP | 1903119 A1 | 3/2008 |
| EP | 2330224 A1 | 6/2011 |
| JP | S5789448 A | 6/1982 |
| JP | 10242553 A | 9/1998 |
| JP | 2001274487 A | 10/2001 |
| JP | 2003147474 A | 5/2003 |
| JP | 2004146579 A | 5/2004 |
| JP | 3875451 B2 | 1/2007 |
| JP | 4519775 B2 | 8/2010 |
| JP | 2015138681 A | 7/2015 |
| JP | 2015527726 A | 9/2015 |
| JP | 2016047964 A | 4/2016 |
| JP | 6175496 B2 | 7/2017 |
| JP | 2018204103 A | 12/2018 |
| KR | 10-20150016982 A | 2/2015 |
| WO | 2010038641 A1 | 4/2010 |
| WO | 2013184387 A1 | 12/2013 |

OTHER PUBLICATIONS

JP Office Action for corresponding JP Patent Application No. 2021-501663 dated Sep. 7, 2022 with Translation, 6 pages.
JP Office Action for corresponding JP Application No. 2021-501663 dated Nov. 22, 2022; 12 pages.
Masanori Kato, "Properties and Applications of High Purity Copper"; Copper Elongation Technology Research Society Journal (1996) vol. 35, pp. 28-35.
Yukio Ishikawa et ak, "Fabrication and evaluation of high-purity copper sputtered films"; Bulletin of the Institute for Advanced Materials Processing, Tohoku University; vol. 54, No. 1,2; dated Mar. 26, 1999, pp. 71-78.
Extended European Search Report for corresponding EP Application No. 20762902.3 dated Feb. 8, 2022.
Korean Office Action for corresponding Korean Patent Applicaiton No. 10-2021-7014263 dated Oct. 19, 2022, 10 pages.
TW Office Action for corresponding Taiwan application TW108148639, dated Dec. 6, 2020, 4 pages.
JP International Search Report for International Application PCT/JP2020/000092, dated Mar. 31, 2020, 4 pages.
JP Written Opinion for International Application PCT/JP2020/000092, dated Mar. 31, 2020, 3 pages.

* cited by examiner

COPPER ELECTRODE MATERIAL

FIELD OF THE INVENTION

The present invention relates to a copper electrode material that can be suitably used for electrodes employed in an acidic atmosphere.

BACKGROUND OF THE INVENTION

Recently, pulsed laser light has been used for integrated circuit photolithography. The pulsed laser light can be generated by applying gas discharge between a pair of electrodes at very short electric discharge and at very high voltage in a gas discharge medium. For example, in ArF laser systems, fluorine-containing plasma is generated between the pair of electrodes during operation. The fluorine-containing plasma is highly corrosive to metals. As a result, the electrodes corrode over time during operation of a pulsed laser generator. The corrosion of the electrodes forms a corrosion spot, which causes arcing in the plasma, thereby further accelerating shortening of the lifetime of the electrode.

Patent Literature 1 discloses the use of a Cu alloy and an Al alloy as electrode alloys. However, corrosion significantly progress for both of the alloys. Patent Literature 2 discloses a technique for prolonging the lifetime of the electrode by using phosphorus-doped brass as a copper alloy used for the electrode to reduce generation of micropores in the brass. Patent Literature 3 discloses a technique for producing a main discharge electrode by forming irregularity on a metal and then carrying out electric discharge in a halogen gas to form a film. However, it does not disclose that a corrosion resistance property of the material metal itself is improved. Patent Literature 4 discloses a technique for improving a preliminary electrolytic dissociation efficiency by plastic-deforming an auxiliary electrode provided with elasticity to bring the auxiliary electrode into contact with a dielectric tube. However, it does not disclose that a corrosion resistance property of the material metal itself is improved.

CITATION LIST

Patent Literatures

[Patent Literature 1] Japanese Patent No. 3875451 B
[Patent Literature 2] Japanese Patent No. 6175496 B
[Patent Literature 3] Japanese Patent Application Publication No. 2004-146579 A
[Patent Literature 4] Japanese Patent Application Publication No. H10-242553 A

SUMMARY OF THE INVENTION

Technical Problem

Even in the prior arts attempting to prolong the lifetime of the electrode by improving the structure of the electrode, the lifetime of the electrode can be further prolonged if corrosion resistance of a copper-containing electrode material is improved. Further, in the technique for prolonging the lifetime by using phosphorus-doped brass, a burden to an increase in the number of steps is caused due to a step of doping the copper-containing alloy with phosphorus to a target concentration. It is preferable that such a burden can be avoided.

Thus, an object of the present invention is to provide a copper-containing electrode material having improved corrosion resistance.

Solution to Problem

As a result of intensive studies, the present inventors have found that a copper electrode material as described below exerts improved corrosion resistance, and they have arrived at the present invention.

Thus, the present invention includes the following aspect (1):

(1)

A copper electrode material, the copper electrode material comprising Cu and inevitable impurities, wherein the inevitable impurities have a content of 1 ppm by mass or less, and an average crystal grain diameter of 100 μm or less.

Advantageous Effects of Invention

According to the present invention, a corrosion-resistant copper electrode material is obtained. The copper electrode material according to the present invention can be suitably used for electrodes employed in an acidic atmosphere, and is particularly suitable for electrodes of ArF laser systems and KrF laser systems. The copper electrode material according to the present invention does not require any doping of other elements during the production and can be produced while avoiding the burden to an increase in the number of steps involved by those doping steps.

DETAILED DESCRIPTION OF THE INVENTION

Figure 1:
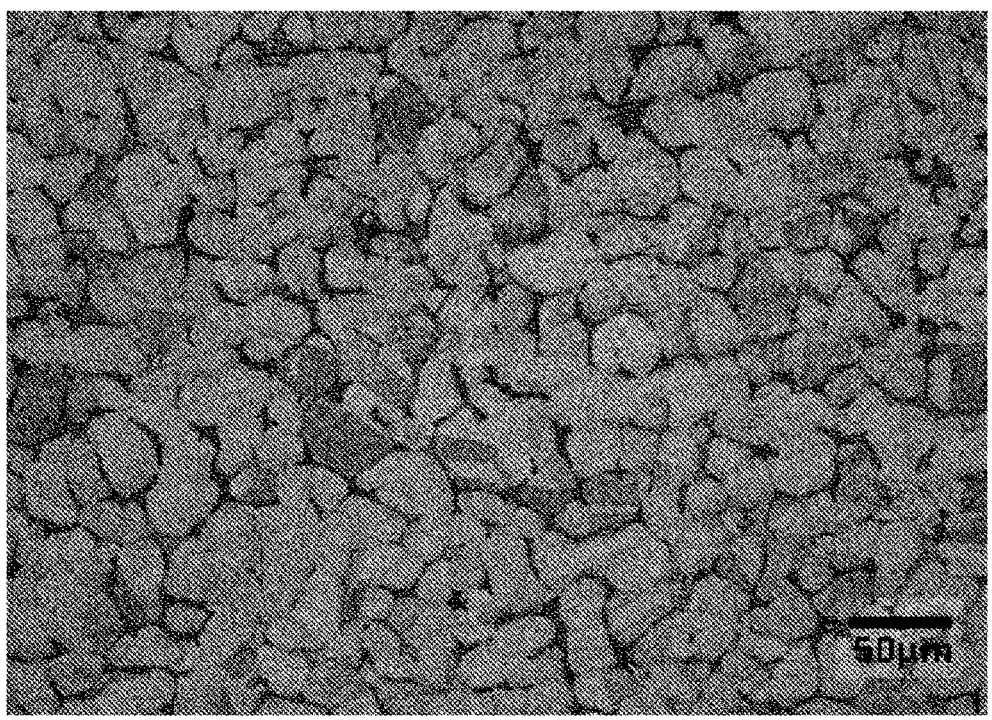
FIG. 1 is an optical microscope photograph of Sample 1 (Example 1)

Hereinafter, the present invention will be described in detail by way of embodiments. The present invention is not limited to the specific embodiments as described below.

[Copper Electrode Material]

A copper electrode material according to the present invention includes Cu and inevitable impurities, wherein the inevitable impurities have a content of 1 ppm by mass or less, and an average crystal grain diameter of 100 μm or less.

[Corrosion Resistance]

The copper electrode material according to the present invention has improved corrosion resistance in a fluorine-containing environment. Therefore, it can be suitably used as a material for corrosion-resistant copper electrodes. The copper electrode material according to the present invention exhibits improved corrosion resistance while avoiding secondary impurity contamination caused by doping for adding other elements, so that it can be used as a high-purity electrode material. Further, the copper electrode material according to the present invention can be formed into an electrode having improved corrosion resistance in combination with the technique for improving corrosion resistance by devising an electrode structure, which is a known art. The corrosion resistance can be specifically tested by a nitrohydrofluoric acid test as shown in Examples.

[Average Crystal Grain Diameter]

In a preferred embodiment, the copper electrode material may have an average crystal grain diameter, for example, in a range of 100 μm or less, and preferably 75 μm or less, and more preferably 50 μm or less, and still more preferably 30 μm or less, and still more preferably 25 μm or less, and still more preferably 20 μm or less. The lower limit of the average crystal grain diameter may be, for example, 1 μm or more, or 5 μm or more, or 10 μm or more, although not particularly limited thereto. The average crystal grain diameter can be measured and calculated by known means, for example, by means as described below in Examples.

[Inevitable Impurities]

In the copper electrode material according to the present invention, the content of inevitable impurities can be, for example, 1 ppm by mass or less, and preferably 0.5 ppm by mass or less. In other words, the copper electrode material according to the present invention can have a Cu content of, for example, 99.9999% by mass or more, and preferably 99.99995% by mass or more.

In a preferred embodiment, the content of each of the following elements as inevitable impurities can be in the range as described. However, the units of the numerical values of the following contents described below are % by mass for those shown as wt %, and ppm by mass for those which are not specifically described.

Li content: 0.01 ppm by mass or less, and preferably less than 0.001 ppm by mass (less than the measurement limit);
Be content: 0.01 ppm by mass or less, and preferably less than 0.001 ppm by mass (less than the measurement limit);
B content: 0.01 ppm by mass or less, and preferably less than 0.001 ppm by mass (less than the measurement limit);
F content: 0.05 ppm by mass or less, and preferably less than 0.005 ppm by mass (less than the measurement limit);
Na content: 0.05 ppm by mass or less, and preferably less than 0.005 ppm by mass (less than the measurement limit);
Mg content: 0.01 ppm by mass or less, and preferably less than 0.001 ppm by mass (less than the measurement limit);
Al content: 0.1 ppm by mass or less, and preferably 0.05 ppm by mass or less, and more preferably 0.002 ppm by mass or less;
Si content: 0.05 ppm by mass or less, and preferably 0.024 ppm by mass or less;
P content: 0.1 ppm by mass or less, and preferably less than 0.05 ppm by mass, and more preferably 0.001 ppm by mass or less, and still more preferably less than 0.001 ppm by mass (less than the measurement limit);
S content: 0.1 ppm by mass or less, and preferably less than 0.05 ppm by mass, and more preferably 0.01 ppm by mass or less, and further preferably 0.009 ppm by mass or less;
Cl content: 0.2 ppm by mass or less, and preferably 0.02 ppm by mass or less;
K content: 0.1 ppm by mass or less, and preferably less than 0.01 ppm by mass (less than the measurement limit);
Ca content: 0.05 ppm by mass or less, and preferably less than 0.005 ppm by mass (less than the measurement limit);
Sc content: 0.01 ppm by mass or less, and preferably less than 0.001 ppm by mass (less than the measurement limit);
Ti content: 0.01 ppm by mass or less, and preferably 0.008 ppm by mass or less;
V content: 0.01 ppm by mass or less, and preferably less than 0.001 ppm by mass (less than the measurement limit);
Cr content: 0.01 ppm by mass or less, and preferably less than 0.002 ppm by mass (less than the measurement limit);
Mn content: 0.01 ppm by mass or less, and preferably less than 0.001 ppm by mass (less than the measurement limit);
Fe content: 0.1 ppm by mass or less, and preferably less than 0.1 ppm by mass, and more preferably 0.01 ppm by mass or less, and further preferably 0.003 ppm by mass or less;
Co content: less than 0.05 ppm by mass, and preferably 0.01 ppm by mass or less, and more preferably less than 0.001 ppm by mass (less than the measurement limit);
Ni content: less than 0.1 ppm by mass, and preferably 0.01 ppm by mass or less, and more preferably less than 0.001 ppm by mass (less than the measurement limit);
Cu content: -;
Zn content: 0.05 ppm by mass or less, and preferably less than 0.005 ppm by mass (less than the measurement limit);
Ga content: 0.1 ppm by mass or less, and preferably less than 0.01 ppm by mass (less than the measurement limit);
Ge content: 0.05 ppm by mass or less, and preferably less than 0.005 ppm by mass (less than the measurement limit);
As content: 0.05 ppm by mass or less, and preferably less than 0.005 ppm by mass (less than the measurement limit);
Se content: 0.1 ppm by mass or less, and preferably less than 0.01 ppm by mass (less than the measurement limit);
Br content: 0.5 ppm by mass or less, and preferably less than 0.05 ppm by mass (less than the measurement limit);
Rb content: 0.01 ppm by mass or less, and preferably less than 0.001 ppm by mass (less than the measurement limit);
Sr content: 0.01 ppm by mass or less, and preferably less than 0.001 ppm by mass (less than the measurement limit);
Y content: 0.01 ppm by mass or less, and preferably less than 0.001 ppm by mass (less than the measurement limit);
Zr content: 0.01 ppm by mass or less, and preferably less than 0.001 ppm by mass (less than the measurement limit);
Nb content: 0.01 ppm by mass or less, and preferably less than 0.001 ppm by mass (less than the measurement limit);
Mo content: 0.05 ppm by mass or less, and preferably less than 0.005 ppm by mass (less than the measurement limit);
Ru content: 0.5 ppm by mass or less, and preferably less than 0.05 ppm by mass (less than the measurement limit);
Rh content: less than 1 ppm by mass, and preferably 0.5 ppm by mass or less, and more preferably less than 0.05 ppm by mass (less than the measurement limit);
Pd content: 0.05 ppm by mass or less, and preferably less than 0.005 ppm by mass (less than the measurement limit);
Ag content: less than 1 ppm by mass, and preferably 0.5 ppm by mass or less, and more preferably 0.16 ppm by mass or less;
Cd content: 0.1 ppm by mass or less, and preferably less than 0.01 ppm by mass (less than the measurement limit);
In content: 0.05 ppm by mass or less, and preferably less than 0.005 ppm by mass (less than the measurement limit);
Sn content: less than 0.5 ppm by mass, and preferably 0.1 ppm by mass or less, and more preferably less than 0.01 ppm by mass (less than the measurement limit);
Sb content: less than 0.005 ppm by mass, and preferably 0.004 ppm by mass or less, and more preferably less than 0.002 ppm by mass (less than the measurement limit);
Te content: 0.5 ppm by mass or less, and preferably less than 0.05 ppm by mass (less than the measurement limit);

I content: 0.05 ppm by mass or less, and preferably less than 0.005 ppm by mass (less than the measurement limit);

Cs content: 0.05 ppm by mass or less, and preferably less than 0.005 ppm by mass (less than the measurement limit);

Ba content: 0.01 ppm by mass or less, and preferably less than 0.001 ppm by mass (less than the measurement limit);

La content: 0.01 ppm by mass or less, and preferably less than 0.001 ppm by mass (less than the measurement limit);

Ce content: 0.01 ppm by mass or less, and preferably less than 0.001 ppm by mass (less than the measurement limit);

Pr content: 0.01 ppm by mass or less, and preferably less than 0.001 ppm by mass (less than the measurement limit);

Nd content: 0.01 ppm by mass or less, and preferably less than 0.001 ppm by mass (less than the measurement limit);

Sm content: 0.01 ppm by mass or less, and preferably less than 0.001 ppm by mass (less than the measurement limit);

Eu content: 0.01 ppm by mass or less, and preferably less than 0.001 ppm by mass (less than the measurement limit);

Gd content: 0.01 ppm by mass or less, and preferably less than 0.001 ppm by mass (less than the measurement limit);

Tb content: 0.01 ppm by mass or less, and preferably less than 0.001 ppm by mass (less than the measurement limit);

Dy content: 0.01 ppm by mass or less, and preferably less than 0.001 ppm by mass (less than the measurement limit);

Ho content: 0.01 ppm by mass or less, and preferably less than 0.001 ppm by mass (less than the measurement limit);

Er content: 0.01 ppm by mass or less, and preferably less than 0.001 ppm by mass (less than the measurement limit);

Tm content: 0.01 ppm by mass or less, and preferably less than 0.001 ppm by mass (less than the measurement limit);

Yb content: 0.01 ppm by mass or less, and preferably less than 0.001 ppm by mass (less than the measurement limit);

Lu content: 0.01 ppm by mass or less, and preferably less than 0.001 ppm by mass (less than the measurement limit);

Hf content: 0.01 ppm by mass or less, and preferably less than 0.001 ppm by mass (less than the measurement limit);

Ta content: 10 ppm by mass or less, and preferably less than 5 ppm by mass (less than the measurement limit);

W content: 0.01 ppm by mass or less, and preferably less than 0.001 ppm by mass (less than the measurement limit);

Re content: 0.01 ppm by mass or less, and preferably less than 0.001 ppm by mass (less than the measurement limit);

Os content: 0.01 ppm by mass or less, and preferably less than 0.001 ppm by mass (less than the measurement limit);

Ir content: 0.01 ppm by mass or less, and preferably less than 0.001 ppm by mass (less than the measurement limit);

Pt content: 0.1 ppm by mass or less, and preferably less than 0.01 ppm by mass (less than the measurement limit);

Au content: 0.1 ppm by mass or less, and preferably less than 0.01 ppm by mass (less than the measurement limit);

Hg content: 0.1 ppm by mass or less, and preferably less than 0.01 ppm by mass (less than the measurement limit);

Tl content: less than 3 ppm by mass, and preferably 0.5 ppm by mass or less, and more preferably less than 0.001 ppm by mass (less than the measurement limit);

Pb content: less than 0.05 ppm by mass, and preferably 0.005 ppm by mass or less, and more preferably less than 0.002 ppm by mass (less than the measurement limit);

Bi content: 0.01 ppm by mass or less, and preferably less than 0.001 ppm by mass (less than the measurement limit);

Th content: 0.001 ppm by mass or less, and preferably less than 0.0001 ppm by mass (less than the measurement limit);

U content: 0.001 ppm by mass or less, and preferably less than 0.0001 ppm by mass (less than the measurement limit);

H content: 2 ppm by mass or less, and preferably less than 1 ppm by mass (less than the measurement limit);

C content: 2 ppm by mass or less, and preferably less than 1 ppm by mass (less than the measurement limit);

N content: 2 ppm by mass or less, and preferably less than 1 ppm by mass (less than the measurement limit);

O content: 2 ppm by mass or less, and preferably less than 1 ppm by mass (less than the measurement limit).

In a preferred embodiment, the contents of the gas components C and O may be, in total, for example, 5 ppm by mass or less, and preferably 2 ppm by mass or less, as contents of inevitable impurities.

[Pore]

In a preferred embodiment, the copper electrode material according to the present invention may have a number of pores having a pore diameter of 10 μm or more of less than 1 pore/cm$^2$, and preferably less than 0.5 pores/cm$^2$, and more preferably 0.1 pores/cm$^2$, as observed by an optical microscope. The number of pores having a pore diameter of 10 μm or more per unit area can be measured by the means as described below in Examples.

[Number of Particles (LPC)]

In a preferred embodiment, the copper electrode material according to the present invention may have a number of particles (LPC) of, for example, 1000 [particles/g] or less, and preferably 500 [particles/g] or less, and more preferably 200 [particles/g] or less, and more preferably 100 [particles/] or less, and even more preferably 50 [particles/g] or less. The number of particles per unit mass (LPC) can be measured by the means as described below in Examples.

[Production of Copper Electrode Material]

The copper electrode material according to the present invention can be produced by a production method as described below in Examples. That is, the copper electrode material can be produced by a method including the steps of: preparing an ingot by melting copper that has been purified to a purity of 6N, i.e., 99.9999% (excluding the gas components) in an induction melting furnace; subjecting the resulting ingot to hot forging under conditions as disclosed in Examples; and machining a forged rod obtained by the hot forging into a shape of the electrode material.

In a preferred embodiment, the hot forging can be carried out, for example, at a temperature in a range of from 600 to 800° C., and preferably from 650 to 750° C., such that that a reduction ratio of a cross sectional area of the ingot is from 50 to 80%, and preferably from 60 to 80%. In the hot forging, preheating may be carried out as desired, for example, by heating to the temperature in the above range for 1 to 15 hours.

PREFERABLE EMBODIMENTS

As preferable embodiments, the present invention includes the following aspects (1) to (6):

(1)

A copper electrode material, the copper electrode material comprising Cu and inevitable impurities, wherein the inevitable impurities have a content of 1 ppm by mass or less, and an average crystal grain diameter of 100 μm or less.

(2)

The copper electrode material according to (1), wherein the copper electrode has a S content of 0.1 ppm by mass or less, a P content of 0.1 ppm by mass or less, a Fe content of 0.1 ppm by mass or less, and an Al content of 0.1 ppm by mass or less, as contents of the inevitable impurities.

(3)

The copper electrode material according to (1) or (2), wherein the copper electrode material contains gas components C and O in a total amount of 5 ppm by mass or less as contents of the inevitable impurities.

(4)

The copper electrode material according to any one of (1) to (3), wherein the copper electrode material has a number of pores having a pore diameter of 10 μm or more of less than 1 pore/cm² as observed by an optical microscope.

(5)

The copper electrode material according to any one of (1) to (4), wherein the copper electrode material has a number of particles (LPC) of 1000 [pieces/g] or less.

(6)

The copper electrode material according to any one of (1) to (4), wherein the copper electrode material has a S content of less than 0.05 ppm by mass, a Fe content of less than 0.1 ppm by mass, a Co content of less than 0.05 ppm by mass, a Ni content of less than 0.1 ppm by mass, an As content of less than 0.005 ppm by mass, a Rh content of less than 1 ppm by mass, a Ag content of less than 1 ppm by mass, a Sn content of less than 0.5 ppm by mass, an Sb content of less than 0.005 ppm by mass, a Te content of less than 0.05 ppm by mass, a Tl content of less than 3 ppm by mass, a Pb content of less than 0.05 ppm by mass, and a P content of less than 0.05 ppm by mass.

EXAMPLES

Hereinafter, the present invention will be described with reference to Examples. The present invention is not limited to the following Examples. Other examples and variations within the spirit of the present invention are included in the present invention.

Example 1

Copper purified to a purity of 6N i.e., 99.9999% (excluding gas components) by electrolytic refining was melted in an induction melting furnace to prepare an ingot having a diameter of 135 mm and a length of 600 mm.

The ingot was cut into half length and subjected to hot forging. The hot forging was carried out under the following conditions.

Forging was carried out by preheating the ingot at a temperature of 800° C. for 3 hours, and carrying out reheating in four steps of: first from φ135 mm to φ130 mm and then φ130 mm→80 mm square→50 mm square→φ41 mm at 850° C. for 10 minutes or more in each step. That is, the hot forging process was conducted by carrying out the reheating at 800° C. for 10 minutes or more every time the forging was performed to draw the ingot in the longitudinal direction so as to reduce the cross-sectional area of the ingot to 60 to 80% of the original cross-sectional area. After carrying out the forging up to φ41 mm, the ingot was cut at each length of 750 mm to obtain four forged rods. The forged rod of Sample 1 was thus obtained.

A sample collected from the Sample 1 was polished up to #2000 with abrasive paper, then subjected to buffing, and observed using an optical microscope (Nikon ECLIPSEMA) in accordance with ASTM E 112-96. As a result, the average crystal grain diameter was 15 μm. The optical microscope photograph of Sample 1 is shown in FIG. 1.

From the round rod (Sample 1), 5.0 g of cut pieces were collected, dissolved in 200 ml of 36.5% hydrochloric acid solution, to which ultrapure water was then added up to 500 ml to obtain a solution which was sampled. The number of particles having a diameter of 0.2 μm was measured with a particle counter of KL-11A/KS-65 from RION Co., Ltd. The measurement was carried out five times, and an average value thereof was determined to be the number of particles. The results are shown in Table 1.

Further, in this case, the contents of alkali metal elements such as Na and K, the contents of radioactive elements such as U and Th, the contents of transition metal elements, the contents of light metal elements such as Al, Ca and Mg, and other contents of Si, Ti, Zr, Hf, B and Ag, and the contents of gas components such as C and O were measured by means as described later. The results are shown in Table 2 (Table 2-1 and Table 2-2, Table 2-3).

TABLE 1

| | Example 1 Sample 1 | Comparative Example 1 Sample 2 | Comparative Example 2 Sample 3 | Comparative Example 3 Sample 4 |
|---|---|---|---|---|
| Purity | 6N | 6N | 4N (OFC) | 4N (OFC) |
| Average Crystal Grain Diameter (μm) | 15 μm | 250 μm | 15 μm | 500 μm |
| LPC (particle/g) | 50 | 50 | 2000 | 2000 |
| Number of Pore (pore/cm²) | ≈0 | 10 | 100 | 1000 |
| Symbols in Corrosion Resistance Graph | a | b | c | d |

Comparative Example 1

The remaining ½ ingot that was not subjected to hot forging in Example 1 was extruded to produce a cylindrical rod (Sample 2). The extrusion process was carried out under the following conditions.

The extrusion process was carried out using a dice having a diameter of φ40 mm such that a finished diameter was about φ41 mm while heating it at 700° C. An extrusion pressure at this time was from 150 to 170 kg/cm². The extrudate was cut every 750 mm from the extruder side to obtain four extruded rods each having a diameter of φ41 mm.

Figure 2:
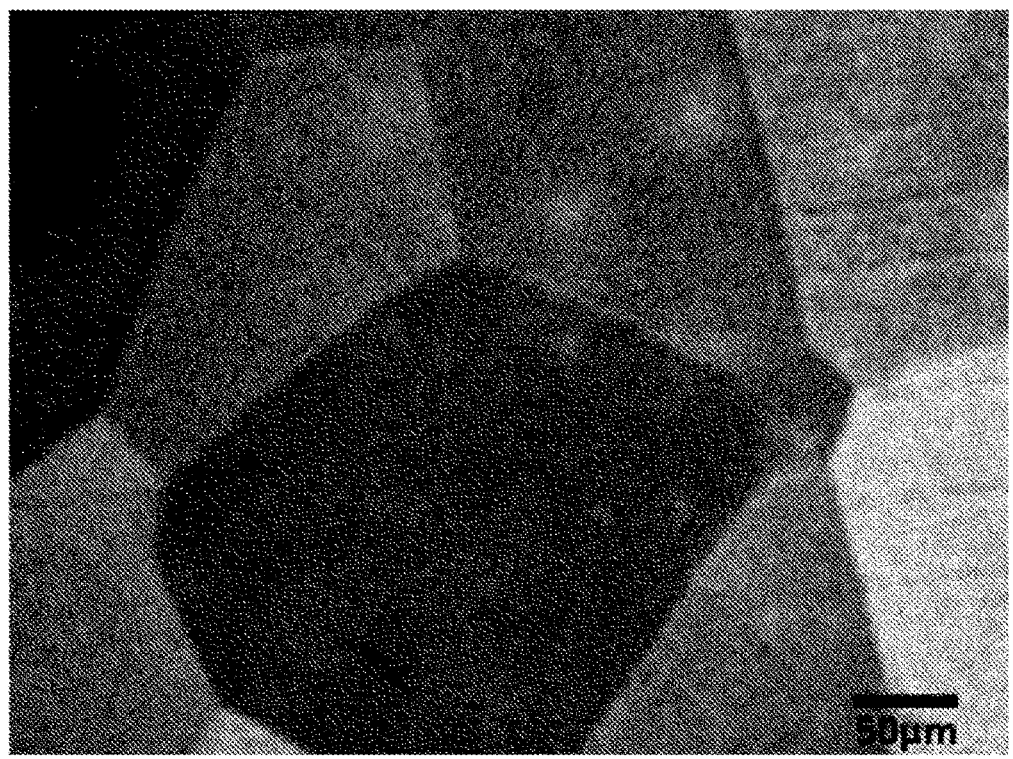
FIG. 2 is an optical microscope photograph of Sample 2 (Comparative Example 1)

For the cylindrical rod (Sample 2), the average crystal grain diameter was determined in the same procedure as that for Sample 1 of Example 1. The average crystal grain diameter of Sample 2 was 250 μm. An optical microscope photograph of Sample 2 is shown in FIG. 2. The number of particles for Sample 2 was measured in the same procedure as that for Sample 1. The results are shown in Table 1.

Comparative Example 2

An ingot having a diameter of 135 mm and a length of 600 mm, which was commercially available oxygen-free copper (JX Nippon Mining & Metals Corporation) (purity 4N), was cut in half in the length direction and subjected to hot forging under the same conditions as those for Sample 1 of Example 1.

A cylindrical rod (Sample 3) having a diameter of 35 mm and a length of 700 mm was prepared from the hot-forged ingot.

Figure 3:
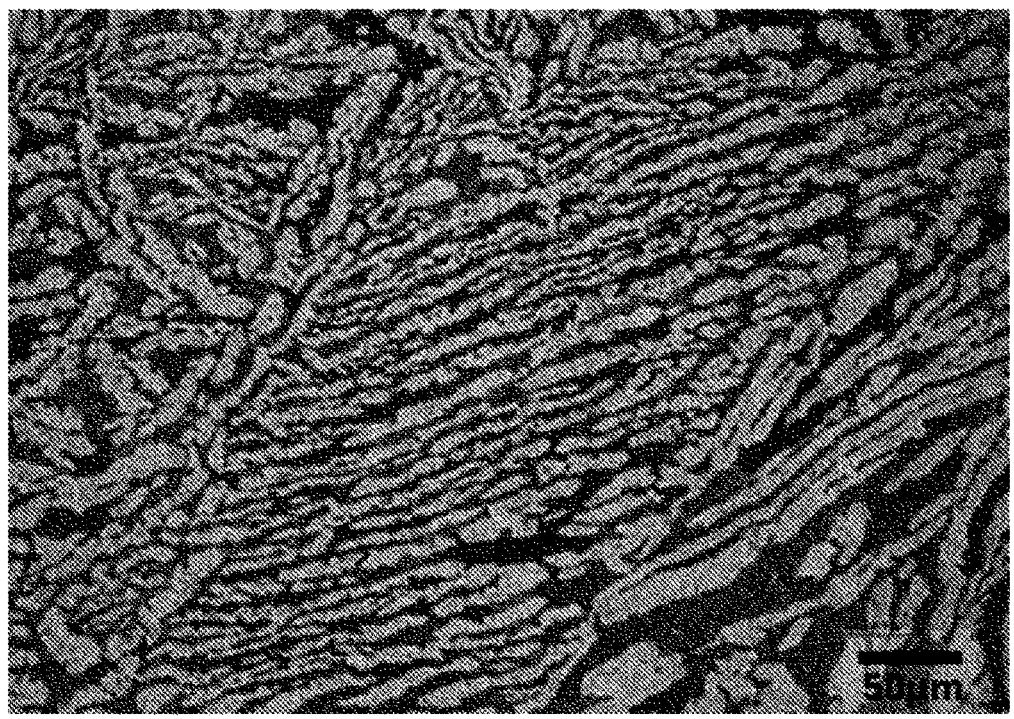
FIG. 3 is an optical microscope photograph of Sample 3 (Comparative Example 2)

For the cylindrical rod (Sample 3), the average crystal grain diameter was determined in the same procedure as that for Sample 1. The average crystal grain diameter for Sample 3 was 15 μm. An optical microscope photograph of Sample 3 is shown in FIG. 3.

Sampling was performed from the cylindrical rod of Sample 3 in the same procedure as that for Sample 1, and the number of particles having a diameter of 0.2 μm or more was measured with a particle counter. The results are shown in Table 1.

Comparative Example 3

The remaining ½ ingot that was not subjected to hot forging in Comparative Example 2 was extruded to produce a cylindrical rod (Sample 4). The extrusion process was carried out under the same conditions as those for Sample 2 in Comparative Example 1.

Figure 4:
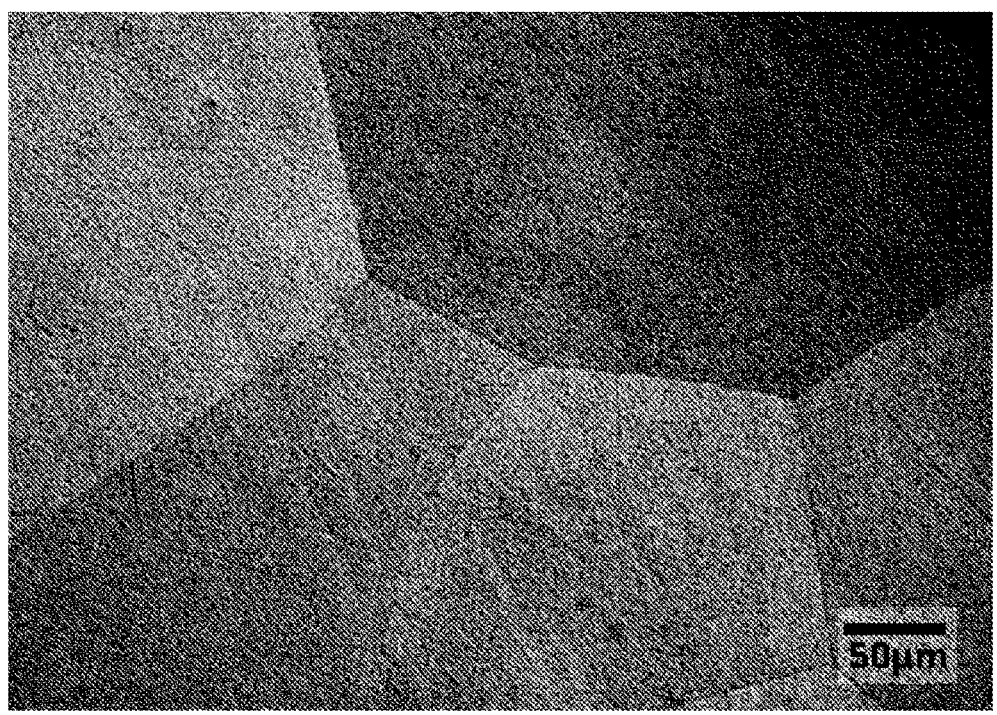
FIG. 4 is an optical microscope photograph of Sample 4 (Comparative Example 3)

For the cylindrical rod (Sample 4), the average crystal grain diameter was determined in the same procedure as that for Sample 1 of Example 1. The average crystal grain diameter of Sample 4 was 500 μm. An optical microscope photograph of Sample 4 is shown in FIG. 4.

Sampling was performed from the cylindrical rod of Sample 4 in the same procedure as that for Sample 1, and the number of particles having a diameter of 0.2 μm or more was measured with a particle counter. The results are shown in Table 1.

[Composition Analysis]

Specifically, the composition analysis was carried out as follows. For the compositions of Samples 1 to 4, the metal elements were analyzed by GD-MS (VG 9000 available from VG Scientific), and the gas components was analyzed by an oxygen/nitrogen analyzer (Model TCH-600) available from LECO for oxygen (O), nitrogen (N) and hydrogen (H), and analyzed by a carbon/sulfur analyzer (Model CS-444) available from LECO for carbon (C). The results obtained are shown in Table 2 (Table 2-1, Table 2-2 and Table 2-3) as described below. For units in the table, those expressed in wt % means % by mass, and those with no specific description means ppm by mass. It should be noted that samples were prepared as described in the procedure of the Production Example as described above, and samples 1 and 2 were made from the same ingot, and samples 3 and 4 were made from the same ingot. Therefore, the samples 1 and 2 and samples 3 and 4 had the same composition, respectively.

TABLE 2

[Table 1-2]

|    | 6N—Cu Sample 1 | 4N—Cu Sample 3 |
|----|----|----|
| Li | <0.001 | <0.001 |
| Be | <0.001 | <0.001 |
| B  | <0.001 | <0.001 |
| F  | <0.005 | <0.005 |
| Na | <0.005 | <0.005 |
| Mg | <0.001 | 0.003 |
| Al | 0.002  | 0.064 |
| Si | 0.024  | 0.19 |
| P  | <0.001 | 0.85 |
| S  | 0.009  | 4.3 |
| Cl | 0.02   | 0.02 |
| K  | <0.01  | <0.01 |
| Ca | <0.005 | <0.005 |
| Sc | <0.001 | <0.001 |
| Ti | 0.008  | <0.001 |
| V  | <0.001 | 0.11 |
| Cr | <0.002 | 0.16 |
| Mn | <0.001 | 0.021 |
| Fe | 0.003  | 1.1 |
| Co | <0.001 | <0.001 |
| Ni | <0.001 | 0.28 |
| Cu | —      | — |
| Zn | <0.005 | 0.036 |
| Ga | <0.01  | <0.01 |
| Ge | <0.005 | <0.005 |

TABLE 2-continued

[Table 2-2]

|    | 6N—Cu Sample 1 | 4N—Cu Sample 3 |
|----|----|----|
| As | <0.005 | 0.029 |
| Se | <0.01  | 0.10 |
| Br | <0.05  | <0.05 |
| Rb | <0.001 | <0.001 |
| Sr | <0.001 | <0.001 |
| Y  | <0.001 | <0.001 |
| Zr | <0.001 | <0.001 |
| Nb | <0.001 | <0.001 |
| Mo | <0.005 | 0.011 |
| Ru | <0.05  | <0.05 |
| Rh | <0.05  | <0.05 |
| Pd | <0.005 | <0.005 |
| Ag | 0.16   | 10 |
| Cd | <0.01  | <0.01 |
| In | <0.005 | <0.005 |
| Sn | <0.01  | 0.05 |
| Sb | <0.002 | 0.11 |
| Te | <0.05  | <0.05 |
| I  | <0.005 | <0.005 |
| Cs | <0.005 | <0.005 |
| Ba | <0.001 | <0.001 |
| La | <0.001 | <0.001 |
| Ce | <0.001 | <0.001 |
| Pr | <0.001 | <0.001 |
| Nd | <0.001 | <0.001 |
| Sm | <0.001 | <0.001 |
| Eu | <0.001 | <0.001 |

[Table 2-3]

|    | 6N—Cu Sample 1 | 4N—Cu Sample 3 |
|----|----|----|
| Gd | <0.001 | <0.001 |
| Tb | <0.001 | <0.001 |
| Dy | <0.001 | <0.001 |
| Ho | <0.001 | <0.001 |
| Er | <0.001 | <0.001 |
| Tm | <0.001 | <0.001 |
| Yb | <0.001 | <0.001 |
| Lu | <0.001 | <0.001 |
| Hf | <0.001 | <0.001 |
| Ta | <5     | <5 |
| W  | <0.001 | <0.001 |
| Re | <0.001 | <0.001 |
| Os | <0.001 | <0.001 |
| Ir | <0.001 | <0.001 |
| Pt | <0.01  | <0.01 |
| Au | <0.01  | <0.01 |
| Hg | <0.01  | <0.01 |
| Tl | <0.001 | <0.001 |
| Pb | <0.002 | 0.050 |
| Bi | <0.001 | 0.031 |
| Th | <0.001 | <0.001 |
| U  | <0.001 | <0.001 |
| H  | <1     | <1 |
| C  | <1     | 2 |
| N  | <1     | <1 |
| O  | <1     | 3 |

[Pore Observation]

Samples 1 to 4 were observed with an optical microscope (observation conditions: polished to #2000 with abrasive paper, then buffed; used apparatus: Nikon ECLIPSE MA 200 at magnifications of 100).

After polishing each of Samples 1 to 4, they were observed in a dark field image at magnifications of 100 with an optical microscope. Because of the dark field image, if pores having sizes more than or equal to a certain level is present, those parts are detected as white shining spots. By this method, pores having a maximum length of about 10 μm or more on a polished surface could be detected. By this method, the number of pores per a surface having 10 mm×10 mm was counted at 10 points, and an average value thereof was calculated. The results are shown in Table 1.

In Sample 1, the number of pores per 10 mm×10 mm was almost zero.

In Sample 2, the number of pores per 10 mm×10 mm was 10.

In Sample 3, the number of pores per 10 mm×10 mm was 100.

In Sample 4, the number of pores per 10 mm×10 mm was 1000. Further, in Sample 4, the presence of larger pores having a pore diameter of 50 μm or more was observed.

As described above, no pore was observed in Sample 1 when observed with the optical microscope. Further, Sample 2 had very few pores when observed with the optical microscope. On the other hand, Sample 3 had a very large number of pores. Further, the number of pores in Sample 4 was smaller than that in Sample 3, but it was very larger than that in Sample 2, and the presence of larger pores was also observed.

[Tensile Strength]

The tensile strength of each of Samples 1 to 4 was measured based on JIS: Z 2241 (2011). The results are summarized in Table 3.

The conductivity of each of Samples 1 to 4 was measured using AutoSigma 3000 from GE Sensing & Inspection Technologies Co., Ltd. The results are summarized in Table 3.

TABLE 3

|  | Sample 1 | Sample 2 | Sample 3 | Sample 4 |
|---|---|---|---|---|
| Tensile strength ($N/mm^2$) | 324 | 235 | 334 | 278 |
| Conductivity (% IACS) | 102 | 113 | 86 | 101 |

[Corrosion Resistance Test]
[Nitric Acid Test]

Figure 5:
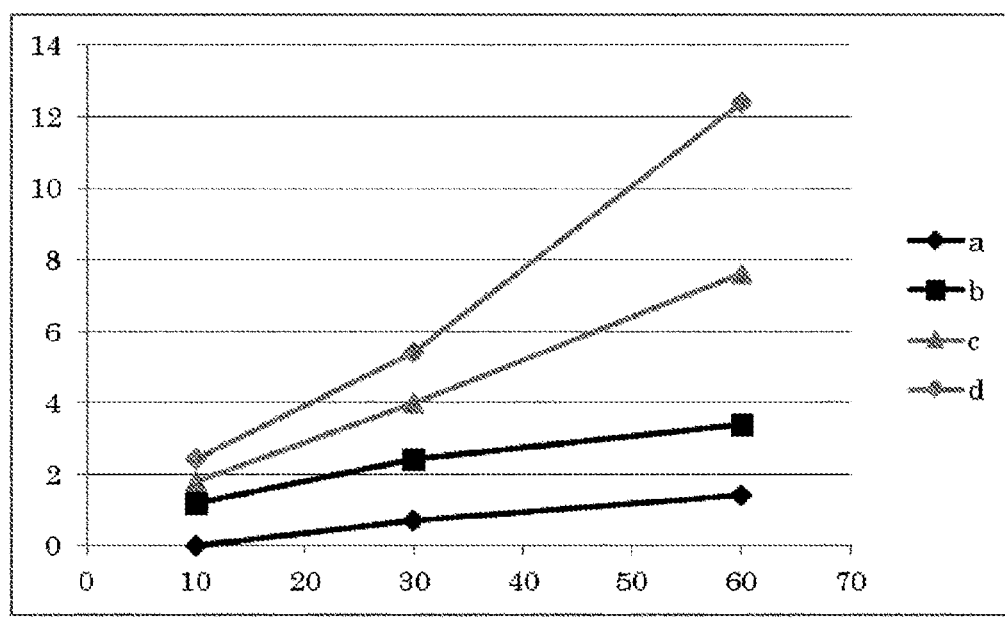
FIG. 5 is a graph showing results of a corrosion resistance test using an aqueous nitric acid solution.

The corrosion resistance test using nitric acid was carried out in the following procedure:

8.4 g of each of Samples 1 to 4 (each size: 10 mm×10 mm×10 mm) was prepared. An aqueous nitric acid solution was prepared by mixing 80 ml of nitric acid (65%) with 420 ml of pure water. Each of Samples 1 to 4 was added to 500 ml of the aqueous nitric acid solution, and measured for weight loss after 10 minutes, 30 minutes and 60 minutes of the addition, with stirring at 25° C., to calculate a dissolved amount ($mg/cm^2$) at each of the above times. The results of the corrosion resistance test using nitric acid are shown in FIG. 5. The symbols a, b, c and d in FIG. 5 corresponds to Sample 1, Sample 2, Sample 3, and Sample 4, respectively. The horizontal axis of FIG. 5 is a leaching time (minute), and the vertical axis is a dissolved amount ($mg/cm^2$).

[Nitrohydrofluoric Acid Test]

Figure 6:
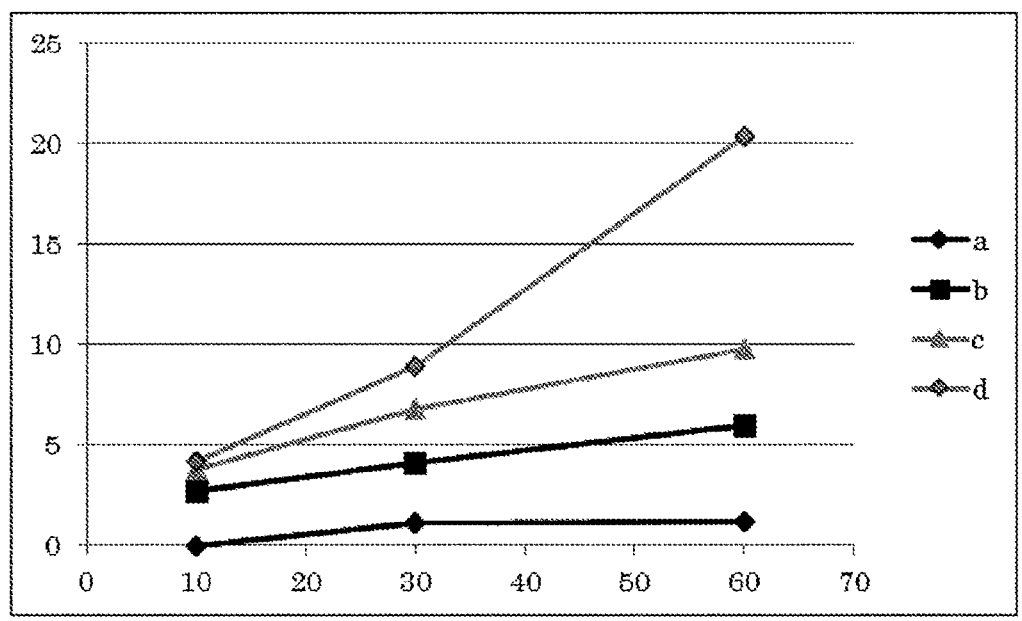
FIG. 6 is a graph showing results of a corrosion resistance test using an aqueous nitrohydrofluoric acid solution.

The corrosion resistance test using nitrohydrofluoric acid was carried out in the following procedure:

8.4 g of each of samples 1 to 4 (each size: 10 mm×10 mm×10 mm) was prepared. An aqueous nitrohydrofluoric acid solution was prepared by mixing 20 ml of hydrofluoric acid (46%), 60 ml of nitric acid (65%) and 420 ml of pure water. Each of Samples 1 to 4 was added to 500 ml of the aqueous nitrohydrofluoric acid solution, and measured for weight loss after 10 minutes, 30 minutes and 60 minutes of the addition, with stirring at 25° C., to calculate a dissolved amount ($mg/cm^2$) at each of the above times. The results of the corrosion resistance test using the aqueous nitrohydrofluoric acid solution are shown in FIG. 6. The symbols a, b, c and d in FIG. 6 corresponds to Sample 1, Sample 2, Sample 3, and Sample 4, respectively. The horizontal axis of FIG. 6 is a leaching time (minute), and the vertical axis is a dissolved amount ($mg/cm^2$).

[Results of Corrosion Resistance Test]

As shown in FIGS. 5 and 6, in Sample 3 and Sample 4 each having the larger number of pores, the dissolution rapidly progressed in both the nitric acid test and the nitrohydrofluoric acid test in the same manner. In Sample 2 having the decreased number of pores as compared with Samples 3 and 4, the dissolution was reduced in both the nitric acid test and the nitrohydrofluoric acid test. In Sample 1 (Example) in which substantially no pore was observed, the dissolution was extremely reduced in both the nitric acid test and the nitrohydrofluoric acid test.

For example, after 60 minutes of the nitric acid test, the ratio of the dissolved amount of Sample 1 to that of Sample 3 was 1/5.43. For example, after 60 minutes of the nitrohydrofluoric acid test, the ratio of the dissolved amount of Sample 1 to that of Sample 3 was 1/8.17. Also, after 60 minutes of the nitric acid test, the ratio of the dissolved amount of Sample 1 to that of Sample 2 was 1/2.43. For example, after 60 minutes of the nitrohydrofluoric acid test, the ratio of the dissolved amount of Sample 1 to that of Sample 2 was 1/5.

[Explanatory View of Production Flow]

Figure 7:
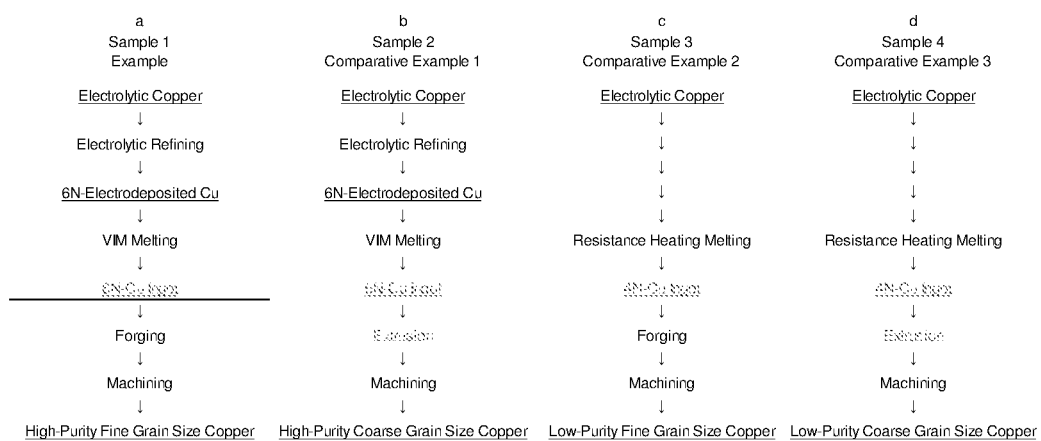
FIG. 7 is an explanatory view illustrating the flow of production of Samples 1 to 4 in Example 1 and Comparative Examples 1 to 3.

FIG. 7 shows an explanatory view illustrating the flow of production of Samples 1 to 4 in Example 1 and Comparative Examples 1 to 3.

INDUSTRIAL APPLICABILITY

The present invention provides a corrosion-resistant copper electrode material. The present invention is an industrially useful invention.

The invention claimed is:

1. A copper electrode material, the copper electrode material comprising Cu which has a purity of 99.9999% by mass or more, excluding gas components, wherein an average crystal grain diameter of Cu is 20 μm or less,
 wherein the copper electrode has a S content of 0.1 parts per million (ppm) by mass or less,
 wherein the copper electrode material has a number of pores having a pore diameter of 10 μm or more of less than 1 pore/$cm^2$ as observed by an optical microscope.

2. The copper electrode material according to claim 1, wherein the copper electrode has a P content of 0.1 ppm by mass or less, a Fe content of 0.1 ppm by mass or less, and an Al content of 0.1 ppm by mass or less.

3. The copper electrode material according to claim 1, wherein the copper electrode material contains as gas components a C content of less than 1 ppm by mass and a O content of less than 1 ppm by mass.

4. The copper electrode material according to claim 1, wherein the copper electrode material has a number of particles (LPC) of 1000 [pieces/g] or less.

5. The copper electrode material according to claim 1, wherein the copper electrode material has a S content of less than 0.05 ppm by mass, a Fe content of less than 0.1 ppm by mass, a Co content of less than 0.05 ppm by mass, a Ni content of less than 0.1 ppm by mass, an As content of less than 0.005 ppm by mass, a Rh content of less than 1 ppm by mass, a Ag content of less than 1 ppm by mass, a Sn content of less than 0.5 ppm by mass, an Sb content of less than 0.005 ppm by mass, a Te content of less than 0.05 ppm by mass, a Tl content of less than 0.5 ppm by mass, a Pb content of less than 0.05 ppm by mass, and a P content of less than 0.05 ppm by mass.

\* \* \* \* \*